(12) United States Patent
Wilson

(10) Patent No.: US 7,249,917 B2
(45) Date of Patent: Jul. 31, 2007

(54) BORING TOOL

(76) Inventor: James P. Wilson, P.O. Box 711252, Santee, CA (US) 92072

( * ) Notice: Subject to any disclaimer, the term of this patent is extended or adjusted under 35 U.S.C. 154(b) by 412 days.

(21) Appl. No.: 10/869,202

(22) Filed: Jun. 16, 2004

(65) Prior Publication Data

US 2005/0281628 A1   Dec. 22, 2005

(51) Int. Cl.
*B23B 29/03* (2006.01)
(52) U.S. Cl. .................. 408/181; 407/66; 407/107; 408/238; 82/131
(58) Field of Classification Search ............... 408/181, 408/185, 184, 199, 238, 239 R, 239 A; 279/6; 407/66, 107; 82/131, 152, 158
See application file for complete search history.

(56) References Cited

U.S. PATENT DOCUMENTS

| 2,209,867 | A | * | 7/1940 | Wohlhaupter | ................. 279/6 |
|---|---|---|---|---|---|
| 2,438,607 | A | * | 3/1948 | Jackson | .......................... 279/6 |
| 2,489,719 | A | * | 11/1949 | Myers | ........................ 82/1.2 |
| 2,838,316 | A | * | 6/1958 | Thomas | ........................ 279/6 |
| 3,067,636 | A | * | 12/1962 | Breuning | .................... 408/185 |
| 3,067,637 | A | * | 12/1962 | Horning | ...................... 82/1.2 |
| 3,606,562 | A | * | 9/1971 | Wills | .......................... 408/181 |

FOREIGN PATENT DOCUMENTS

JP        02088108 A  *  3/1990

* cited by examiner

*Primary Examiner*—Daniel W. Howell
(74) *Attorney, Agent, or Firm*—Calif Tervo; Palomar Patent

(57) ABSTRACT

A boring tool for use in a tool holder, such as a boring head, that is driven about a drive axis and includes a pair of parallel bores for mounting boring tools generally includes a body including a cutting edge and a pair of mounting shanks for mounting in the bores of the tool holder. Preferably, the mounting shanks can be mounted in either bore and the cutting edge is disposed on the body so as to be different distances from the driven axis depending upon in which bores the mounting shanks are mounted.

13 Claims, 2 Drawing Sheets

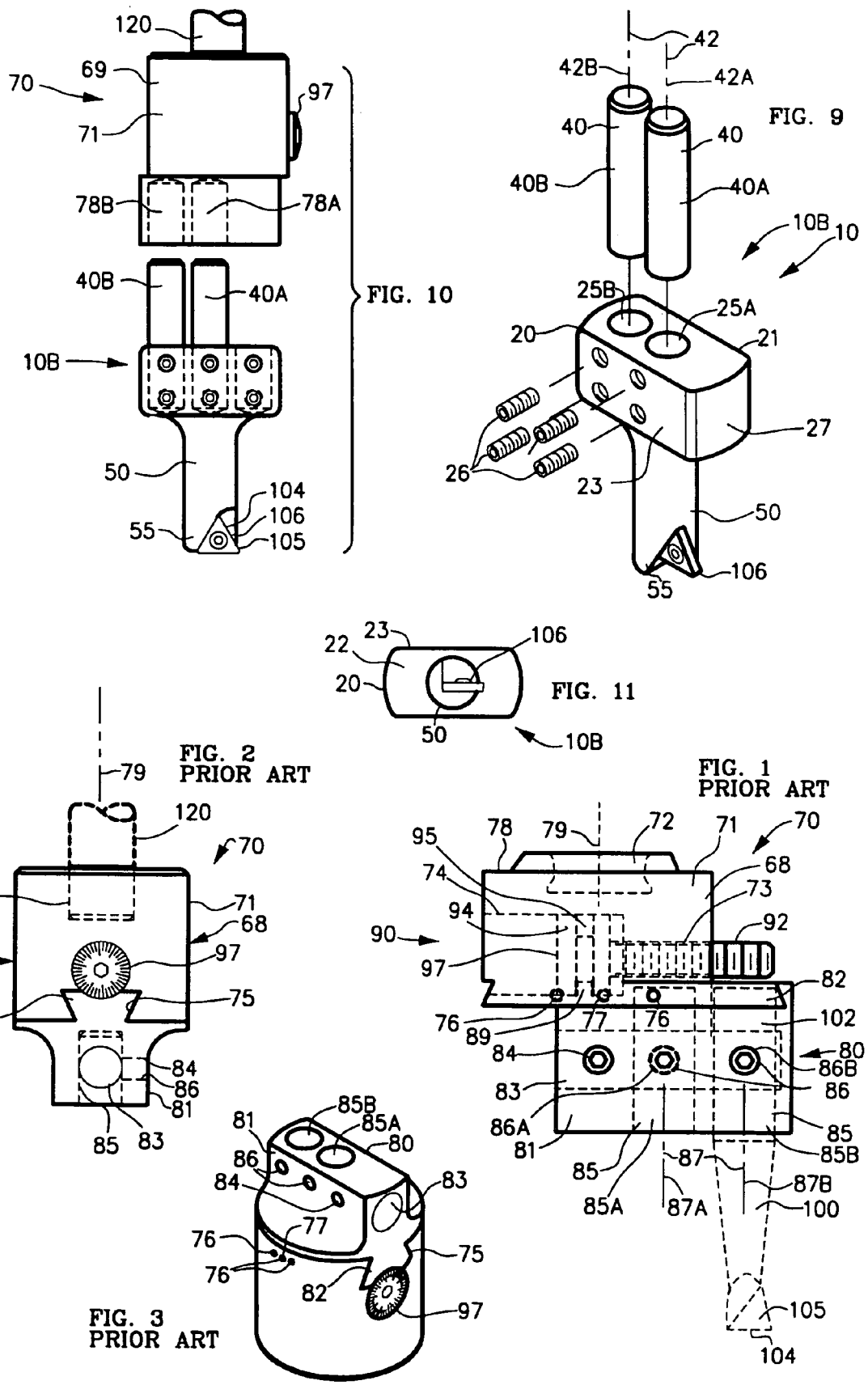

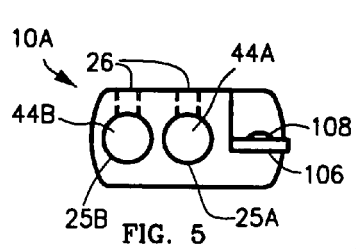
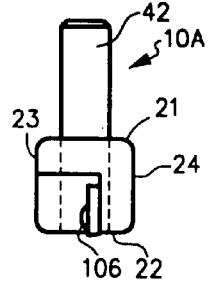
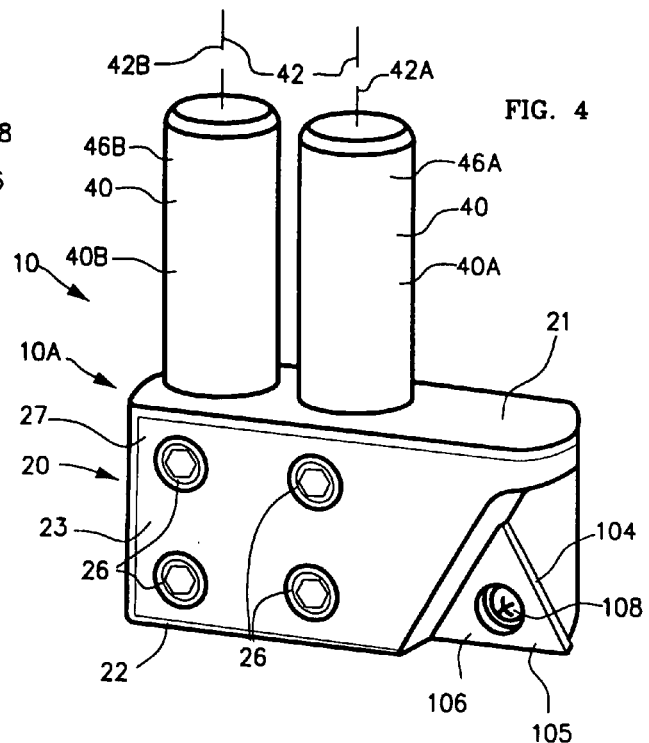
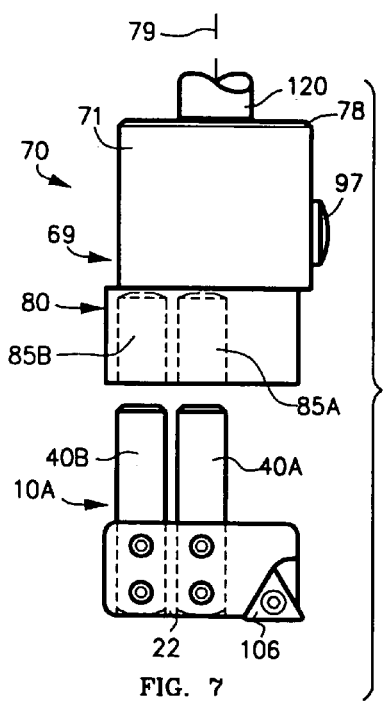
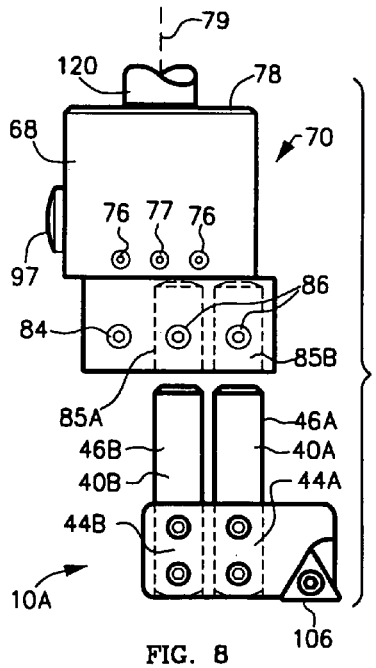
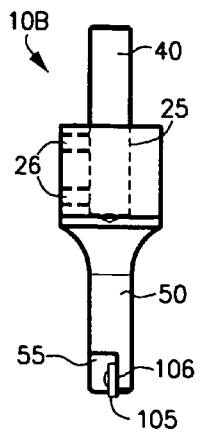

BORING TOOL

FIELD OF THE INVENTION

This invention relates in general to boring tools and more specifically involves a boring tool with two mounting shafts for attachment to a boring head.

BACKGROUND OF THE INVENTION

The general concept of boring is to offset a cutting edge from a driven axis of rotation to make a cut having a radius of the offset.

FIG. 1 is a front elevation view of a conventional prior art adjustable boring head 70 further showing in phantom a conventional prior art boring tool, such as boring bar 100 mounted therein. FIG. 2 is a left side view of the prior art boring head 70 of FIG. 1 further showing in phantom a drive shaft 120. FIG. 3 is a bottom, front, left side perspective view of the prior art boring head 70 of FIG. 1.

Boring head 70 has a front 68 and a back 69 and generally includes a body 71, a boring tool holder, such as boring bar holder 80, and radius adjustment means, such as dial screw 90, for adjusting the radius of the cut. The top 78 of body 71 includes mounting means, such as threaded bore 72, shown in phantom, having an axis 79, for attachment of a drive 120, shown in phantom. A typical drive 120 is a shank having a lower end adapted, such as by being threaded, for attachment to bore 72, and an upper end, not shown, adapted for attachment to the drive spindle of a machine, such a milling machine. Typically, the upper end is tapered for mating to a drive spindle or is straight for mating with a collet that is tapered for mating with the spindle. Drive 120 is a cylindrical shaft, typically of three-quarters inch or seven-eighths inch diameter or greater. Typically, drive 120 is three quarters inch diameter for a two inch diameter boring head.

Body 71 includes a left side bore 74 for travel of head portion 94 of dial screw 90, a horizontal threaded bore 73 for receiving screw portion 92 of dial screw 90, and a fully transverse dove tail slot 75 in the bottom of body 71.

Bar holder 80 has a front side 81 and a top including a dove tail 82 slidingly mounted in dove tail slot 75 of body. Bar holder 80 includes three holes, such as cross bore 83 and vertical bores 85, such as medial bore 85A and lateral bore 85B. Each bore 83, 85A, 85B is adapted for holding a tool, such as a boring bar 100 Cross-bore 83 is a horizontal bore, shown in phantom in FIG. 1. Means, such as set screw 84 in a threaded bore, is provided for retaining a boring bar 100 in cross hole 83. Medial bore 85A is located near the middle of bar holder 80 for receiving a tool, such as a boring bar 100. A set screw 86, such as set screw 86A, in a threaded bore, retains boring bar 100 in medial bore 85A. Lateral bore 85B is located in bar holder 80 laterally of medial bore 85A for receiving a tool, such as boring bar 100. A set screw 86, such as set screw 86B, in a threaded bore, retains boring bar 100 in lateral bore 85B. Medial bore 85A has a longitudinal axis 87A and lateral bore 85B has a lateral axis 87B parallel to axis 87A. Vertical bores 85 are generally about three-eighths inch to one-half inch diameter, such that the diameter of an inserted boring bar 100 is much less than the diameter of drive 120.

Boring bar 100, shown, is an elongate generally cylindrical shaft, such as of high speed steel, with its cylindrical shank 102 mounted in lateral bore 85B. Boring tool 100 includes a lower end including a location 104 adapted for having a cutting edge 105. Cutting edge 105 may be integral with bar 100, such as if the bar is of high speed steel, or may be on an attached insert 106, as shown in FIGS. 4 and 9 of the current invention.

Dial screw 90 adjusts the radius of cut of cutting edge 104 by moving bar holder 80 horizontally relative to body 71. Dial screw 90 includes a machine screw portion 92 in threaded bore 73 in body 71 and a head portion 94 attached thereto including an annular groove 95 and a graduated dial 97. Rotation of dial 97 moves screw portion 92 in threaded bore 73 and moves dial screw 90 horizontally. A tooth or web 89 on top of bar holder 80 engages annular groove 95 in head portion 94 of dial screw 90 so as to move bar holder 80 horizontally with dial screw 90. Gib screws 76 in bores in body 71 bear against dove tail 82 to adjust play in the dove tail joint and include a set screw 77 for locking dove tail 82 and hence bar holder 80 at a selected dialed position.

With boring bar 100 mounted in medial bore 85A, dial screw 90 can be adjusted to bore a first range of radii. With boring bar 100 mounted in lateral bore 85B, dial screw 90 can be adjusted to bore a second range of radii; the second range generally overlapping the first range.

There are several drawbacks to mounting a conventional boring bar 100 in boring head 70. One drawback is that a boring tool, such as boring bar 100, is attached thereto with just a set screw, such as set screw 86, that is typically tightened on a round mounting shank, such as shank 102. Because cutting edge 105 is offset on the shank, a rotational force is produced that set screw 86 sometimes cannot resist. Consequently, shank 102 sometimes slips on set screw 86 and rotates in bore 85, which is undesirable.

Another drawback of mounting a conventional boring bar 100 in boring head 70 is that that the diameters, and hence the strengths, of conventional boring tools 100 that can be mounted are much smaller than the diameter and strength of drive shaft 120. The lower strength boring bar 100 may break, deflect, vibrate or chatter; any of which is undesirable.

Therefore, it would be desirable to have an improved boring tool for mounting in a boring head of the type shown and described wherein the improved head is not subject to rotating in the mounting bore and is not as subject to breaking, bending or chattering.

SUMMARY OF THE INVENTION

The invention is a boring tool for use in a tool holder that is driven about a drive axis and includes a pair of parallel bores for mounting boring tools. The boring tool generally includes a body including a cutting edge and a pair of mounting shanks for mounting in the bores of the tool holder. Preferably, the mounting shanks can be mounted in either bore and the Cutting edge is disposed on the body so as to be different distances from the driven axis depending upon in which bores the mounting shanks are mounted.

The features and advantages of the invention will be readily understood when the detailed description thereof is read in conjunction with the accompanying drawings wherein like reference numerals refer to like parts throughout.

BRIEF DESCRIPTION OF THE DRAWINGS

FIG. 1 is a front elevation view of a conventional prior art adjustable boring head showing the bores for receiving boring tool in phantom and further showing in phantom a prior art conventional boring tool mounted therein.

FIG. 2 is a left side view of the boring head of FIG. 1 further showing in phantom a drive shaft.

FIG. 3 is a bottom, front, left side perspective view of the boring head of FIG. 1.

FIG. 4 is a top, front, right end perspective of a first embodiment of the boring tool of the invention.

FIG. 5 is a bottom plan view of the tool of FIG. 4.

FIG. 6 is a right end elevation view of the tool of FIG. 4.

FIG. 7 is an exploded front view of the tool of FIG. 4 aligned for attachment from the back of the head of FIG. 1.

FIG. 8 is an exploded front view of the tool of FIG. 4 aligned for attachment from the front of the head of FIG. 1.

FIG. 9 is an exploded top, front, right end of a second embodiment of the tool of the invention.

FIG. 10 is a front exploded view of the tool of FIG. 9 aligned for attachment to the back of the head of FIG. 1.

FIG. 11 is a bottom plan view of the tool of FIG. 9.

FIG. 12 is a right end view of the tool of FIG. 9.

DETAILED DESCRIPTION OF THE INVENTION

FIG. 4 is a top, front, right end perspective of a first embodiment 10A of the boring tool 10 of the invention. FIG. 5 is a bottom plan view of tool 10A of FIG. 4. FIG. 6 is a right end elevation view of tool 10A of FIG. 4. FIG. 7 is an exploded front view of tool 10A of FIG. 4 aligned for attachment from back 69 of the head 70 of FIG. 1. FIG. 8 is an exploded front view of tool 10A of FIG. 4 aligned for attachment from front 68 of head 70 of FIG. 1.

Boring tool 10A is adapted for attachment to a tool holder, such as boring head 70, and generally comprises a body 20 and a pair of cylindrical mounting shanks 40, including first shank 40A and second shank 40B.

Body 20 includes an upper portion 27 that is roughly a parallelepiped including a pair of vertical bores 25 therein, including a first bore 25A and a second bore 25B. Body 20 has a top 21, bottom 22, front 23, and back 24 and includes a cutting edge 105 or a location 104 for attachment of cutting edge 105, such as for attachment of an insert 106, such as of carbide or ceramic, having a cutting edge 105. Screw 108 attached insert 106 to a threaded bore in body 20.

Mounting shanks 40 each include a first end 44 and a second end 46. First end 44A of first shank 40A is attached to body 20, such as by insertion in first bore 25A. Second end 46A of first shank 40A is distal from body 20. First end 44B of second shank 40B is attached to body 20, such as by insertion in second bore 25B. Second end 46B of second shank 40B is distal from body 20. Means, such as set screws 26 in threaded bores in body 20, retains shanks 40 on bores 25. Preferably, first shank 40A has a longitudinal axis 42A, and second shank 40B has a longitudinal axis 42B parallel to longitudinal axis 42A of first shank 40A. Body 20 can be of any preferred dimensions. Body 20 is stronger than either mounting shank 40.

As seen in FIG. 7, first and second mounting shanks 40A, 40B are adapted for tandem mounting in first bore 85A and second bore 85B respectively of tool holder 70 for attaching boring tool 10A to tool holder 70.

As shown in FIG. 8, preferably, tool 10A is mountingly reversible such that first and second mounting shanks 40A, 40B are also adapted for tandem mounting in second bore 85B and first bore 85A respectively of tool holder 70. In this case, it is preferable that cutting edge 105 be disposed on body 71 such that the cutting radii are different upon reversal of the mounting. If first and second mounting shanks 40A, 40B have longitudinal axes 42A, 42B, then reversal will produce different cutting radii if cutting edge 105 is nearer to one of the axes 42.

Having two mounting shanks 40 prevents rotation of boring tool 10A in a mounting bore.

Having two mounting shanks 40 and a body 20 that is stronger than either shank 40, makes boring tool 10A stronger and less subject to breaking, bending, vibration, or chattering than a conventional mounted boring tool 100 having only one mounting shank 102.

FIG. 9 is an exploded top, front, right end of a second embodiment 10B of the tool 10 of the invention. FIG. 10 is an exploded front view of the tool 10B of FIG. 9 aligned for attachment from the back 69 of boring head 70 of FIG. 1. FIG. 11 is a bottom plan view of tool 10B of FIG. 9. FIG. 12 is a right end view of tool 10B of FIG. 9.

Boring tool 10B is similar to tool 10A except that bottom 22 of body 20 includes a downward extending boring shaft 50 having a lower end 55 including a cutting edge 105 or a location 104 for attachment of cutting edge 105, such as for attachment of an insert 106, such as of carbide or ceramic, having a cutting edge 105. Shaft 50 is typically in the range of nine-sixteenths inch to three-quarters inch for a boring head 70 having a seven-eighths drive shaft 120. Body 20 including shaft 50 is stronger than either of the mounting shanks 40 such that tool 10B is less subject to breaking, bending, vibration, or chattering than a conventional mounted boring tool 100.

From the foregoing description, it is seen that the present invention provides an extremely simple device for preventing rotation of the cutting face and for reducing breaking, bending or chattering of the boring tool.

Although a particular embodiment of the invention has been illustrated and described, various changes may be made in the form, composition, construction, and arrangement of the parts herein without sacrificing any of its advantages. For example, although only two mounting shafts are shown and described, it can be seen that more mounting shafts could be used if more mounting holes are available. Therefore, it is to be understood that all matter herein is to be interpreted as illustrative and not in any limiting sense, and it is intended to cover in the appended claims such modifications as come within the true spirit and scope of the invention.

I claim:

1. A boring tool for attachment to a tool holder for driven rotation about a driven axis; the tool holder including: a first bore for receiving a boring tool; and a second bore for receiving a boring tool; said boring tool comprising:
    a body;
    a first shank including:
        a first end attached to said body; and
        a second end distal from said body;
    a second shank including:
        a first end attached to said body; and
        a second end distal from said body; said first shank and said second shank adapted for tandem mounting in the first bore and the second bore respectively of the tool holder for attaching said boring tool to the tool holder; and
    a cutting edge directly attached to said body; wherein said body is stronger than either said first shank or said second shank.

2. The boring tool of claim 1;
    said first shank having a longitudinal axis; and
    said second shank having a longitudinal axis parallel to the longitudinal axis of said first shank.

3. The boring tool of claim 1;
    said body including:
        a first bore therein; and
        a second bore therein; said first end of said first shank being mounted in said first bore of said body; and said first end of said second shank being mounted in said first bore of said body.

4. The boring tool of claim 3;
said first shank having a longitudinal axis; and
said second shank having a longitudinal axis parallel to the longitudinal axis of said first shank.

5. The boring tool of claim 1:
said first shank and said second shank adapted for tandem mounting in reverse, that is in the second bore and the first bore respectively of the tool holder, for attaching said boring tool to the tool holder.

6. The boring tool of claim 5:
said cutting edge being located on said body such that cutting radii are different upon reversal of the mounting.

7. The boring tool of claim 5;
said first shank having a longitudinal axis;
said second shank having a longitudinal axis parallel to the longitudinal axis of said first shank; and
said cutting edge is nearer to said longitudinal axis of said first shank.

8. In combination:
a tool holder for driven rotation about a driven axis including:
  a first bore having a longitudinal axis parallel to the driven axis; said first bore for receiving a boring tool; and
  a second bore having a longitudinal axis parallel to the longitudinal axis of the said first bore; said second bore for receiving a boring tool; and
a boring tool comprising:
  a body;
  a first shank:
    a first end attached to said body; and
    a second end distal from said body; and
  a second shank including:
    a first end attached to said body;
    a second end distal from said body; said first shank and said second shanks respectively mounted in said first bore and said second bore of said tool holder: and
a cutting edge directly attached to said body; wherein said body is stronger than either said first shank or said second shank.

9. The boring tool of claim 8;
said body including:
  a first bore therein; and
  a second bore therein; said first end of said first shank being mounted in said first bore of said body; and said first end of said second shank being mounted in said first bore of said body.

10. The boring tool of claim 8;
said first shank having a longitudinal axis; and
said second shank having a longitudinal axis parallel to the longitudinal axis of said first shank.

11. The boring tool of claim 8:
said first shank and said second shank being adapted for tandem mounting in reverse, that is in the second bore and the first bore respectively of the tool holder for attaching said boring tool to the tool holder.

12. The boring tool of claim 11:
said cutting edge being located on said body such that cutting radii are different upon reversal of the mounting.

13. The boring tool of claim 11;
said first shank having a longitudinal axis;
said second shank having a longitudinal axis parallel to the longitudinal axis of said first shank; and
said cutting edge is nearer to said longitudinal axis of said first shank.

* * * * *